United States Patent [19]
Coffey, Jr.

[11] Patent Number: 5,641,069
[45] Date of Patent: Jun. 24, 1997

[54] GRAVITATIONAL, VIBRATIONAL ERGONOMIC MIXED RECYCLABLES SORTATION PROCESS AND APPARATUS

[76] Inventor: Ray Stratton Coffey, Jr., P.O. Box 70, Craigsville, Va. 24430

[21] Appl. No.: 379,913

[22] Filed: Jan. 30, 1995

[51] Int. Cl.$^6$ ........................................... B03B 7/00
[52] U.S. Cl. .................... 209/44.4; 209/630; 209/632; 209/703; 209/930
[58] Field of Search .................... 209/44.4, 44.1, 209/44, 930, 630, 632, 633, 659, 674, 702, 703, 705, 274, 281, 282, 448, 458, 461

[56] References Cited

U.S. PATENT DOCUMENTS

| | | | |
|---|---|---|---|
| 3,973,735 | 8/1976 | Ito et al. | |
| 4,127,476 | 11/1978 | Iannazzi | 209/3 |
| 5,116,486 | 5/1992 | Pederson | 209/44.4 X |
| 5,148,758 | 9/1992 | Saly et al. | |
| 5,197,678 | 3/1993 | Trezek et al. | |
| 5,234,109 | 8/1993 | Pederson | 209/44.2 X |
| 5,249,690 | 10/1993 | Patterson | 209/630 |
| 5,250,100 | 10/1993 | Armbristor | |
| 5,301,816 | 4/1994 | Weber et al. | 209/616 |
| 5,314,071 | 5/1994 | Christian et al. | 209/4 |
| 5,322,170 | 6/1994 | Hadden | 209/314 |
| 5,333,797 | 8/1994 | Becker et al. | |
| 5,344,025 | 9/1994 | Tyler et al. | 209/35 |
| 5,350,121 | 9/1994 | Vitunac et al. | |

Primary Examiner—David H. Bollinger

[57] ABSTRACT

A process and apparatus are presented for mixed recyclable separation, storage and debris removal via gravitational and vibrational forces, three dimensional screening, negative sortation and positive ergonomically designed human sortation.

Mixed recyclables placed within a tube are propelled upward for ergonomically advantageous manual sortation. Material not removed by the first sorter is negatively sorted onto vibrating parallel bars. Desirable materials pass through the bars into a vibrating concave funnel shaped screen. Dirt, debris and any materials smaller in size than the smallest desired recyclable are removed by vibrational and gravitational forces within the three dimensional screen. This results in removal of dirt and debris by outward movement through vertically and horizontally oriented screen voids, in contrast to existing systems in which two dimensional, horizontally mounted screens are employed. Mixed recyclables remain in the vibrating concave funnel shaped screen until sufficient time has elapsed for concentrated layers of similar specific gravity and size items to develop. For example, discrete layers of similar size glass containers and similar size aluminum containers develop within this vibrational concave funnel shaped screen. Upon development of these discrete layers, the bottom layer is released onto a conveyor belt for manual removal and placement into a storage bin designated for this layer. Successively higher layers follow onto the conveyor belt and are manually removed and placed into their respective storage bins. Use of adjustable sortation platforms throughout the system results in ergonomic benefits to the sorters and increased manual sortation efficiency.

19 Claims, 3 Drawing Sheets

GRAVITATIONAL, VIBRATIONAL ERGONOMIC MIXED RECYCLABLES SORTATION PROCESS AND APPARATUS

BACKGROUND OF THE INVENTION

Recyclables recovery from municipal solid waste (MSW) has a history in the United States dating from the early 1900's. Material recovery from MSW developed out of necessity in refuse incineration and composting operations. Noncombustible/nonbiodegradeable objects (e.g. metal cans, glass bottles) were obstacles to efficient incineration and composting, and methods were found to remove them prior to waste processing. Picking these items from a moving conveyor belt prior to processing by incineration or composting is one method employed in this early era which is still in use today. The usefulness of improving this process by novel means is illustrated in a U.S. Department of Energy Small Business Innovation Research Program Solicitation:

Although landfilling is the most common waste management option, most states and many communities have set goals for diverting municipal solid waste (MSW) from landfills. These objectives are generally expressed as material recycle goals. A major obstacle to achieving these goals is the cost of collecting and/or preparing them as marketable secondary materials. Also, current practice often uses manual labor to conduct the sorting. Generally, the cost of recovering the material exceeds the cost of similar virgin materials. Innovative technology is needed that will reduce these costs and/or minimize the manual labor for generating marketable secondary materials.[1]

SUMMARY OF THE INVENTION

This invention concerns a process and apparatus for sortation of mixed recyclables prior to an ergonomically designed picking belt manual sortation system. The process employed involves pushing mixed waste upward inside a cylinder and over a sortation lip and vibratory classification and separation of discrete layers of recyclables within a concave vibrating screen receptacle based on differences in specific gravity and size. The apparatus consists of a hybridization of vibratory/gravitational separation and human sortation. The process capitalizes on strengths of human sortation (e.g. human vision allows separation based on size, color, material type) and mechanical separation (e.g. sortation of large volumes in a short space of time brought about by vibratory movement and based on gravitational law). This process removes debris larger and smaller than the recyclables of interest (e.g. bottles, cans) by exclusion based on screen size, by negative sortation and by positive human sortation.

Goals of 60% for recovering materials from MSW have been established by U.S. States and localities.[2] This invention is focused on bridging the gap between this goal and the maximum recovery rate of 40% established to date.[2] Failures of existing mixed waste processing plants have been attributed to low recovery rates and equipment problems.[3] The process and apparatus presented are designed to reduce these operational problems.

DESCRIPTION OF THE INVENTION

Figure 1:
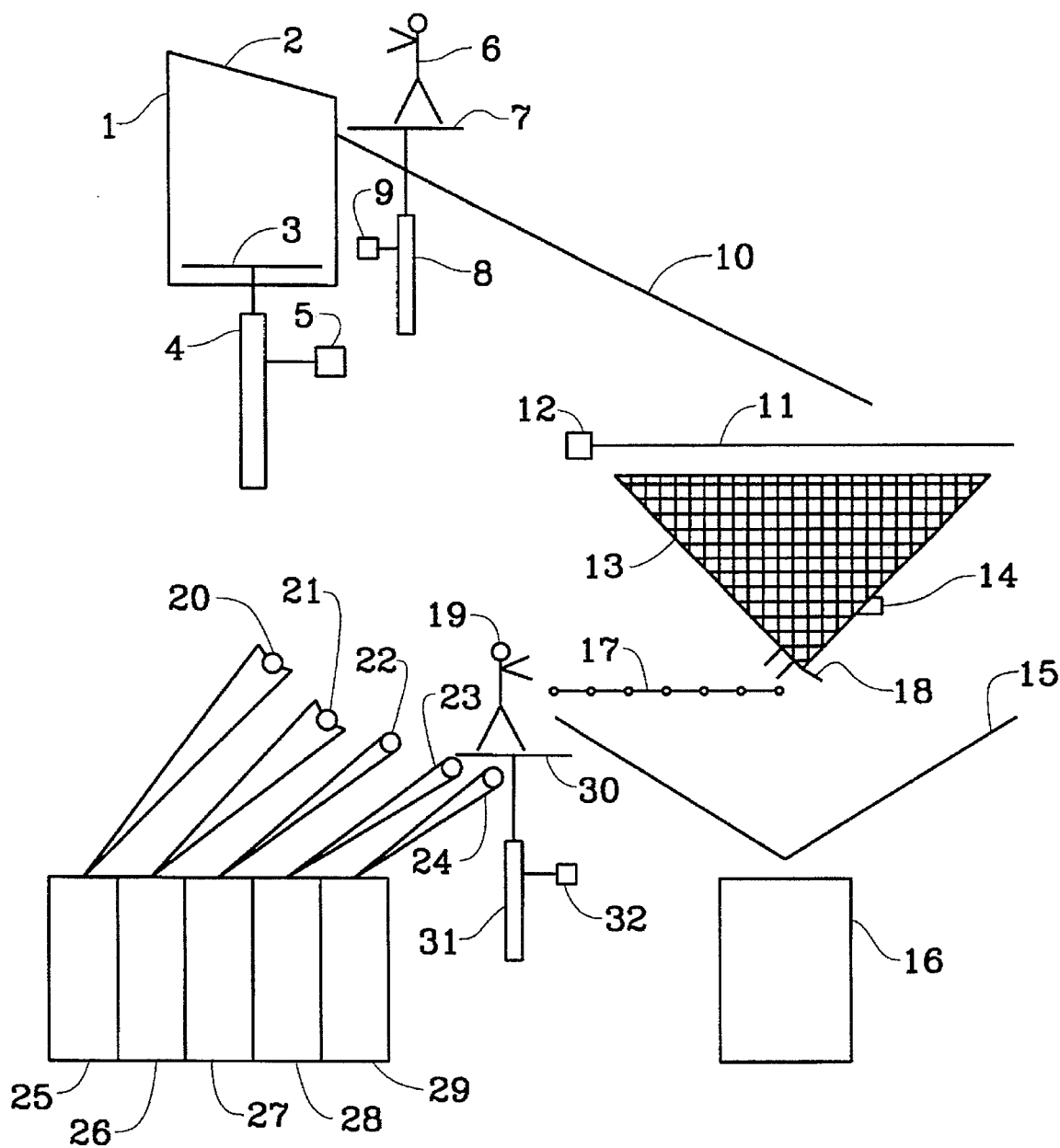
FIG. 1 side view illustrating sortation, conveyance, screening and ergonomic positioning apparatus.
Figure 2:
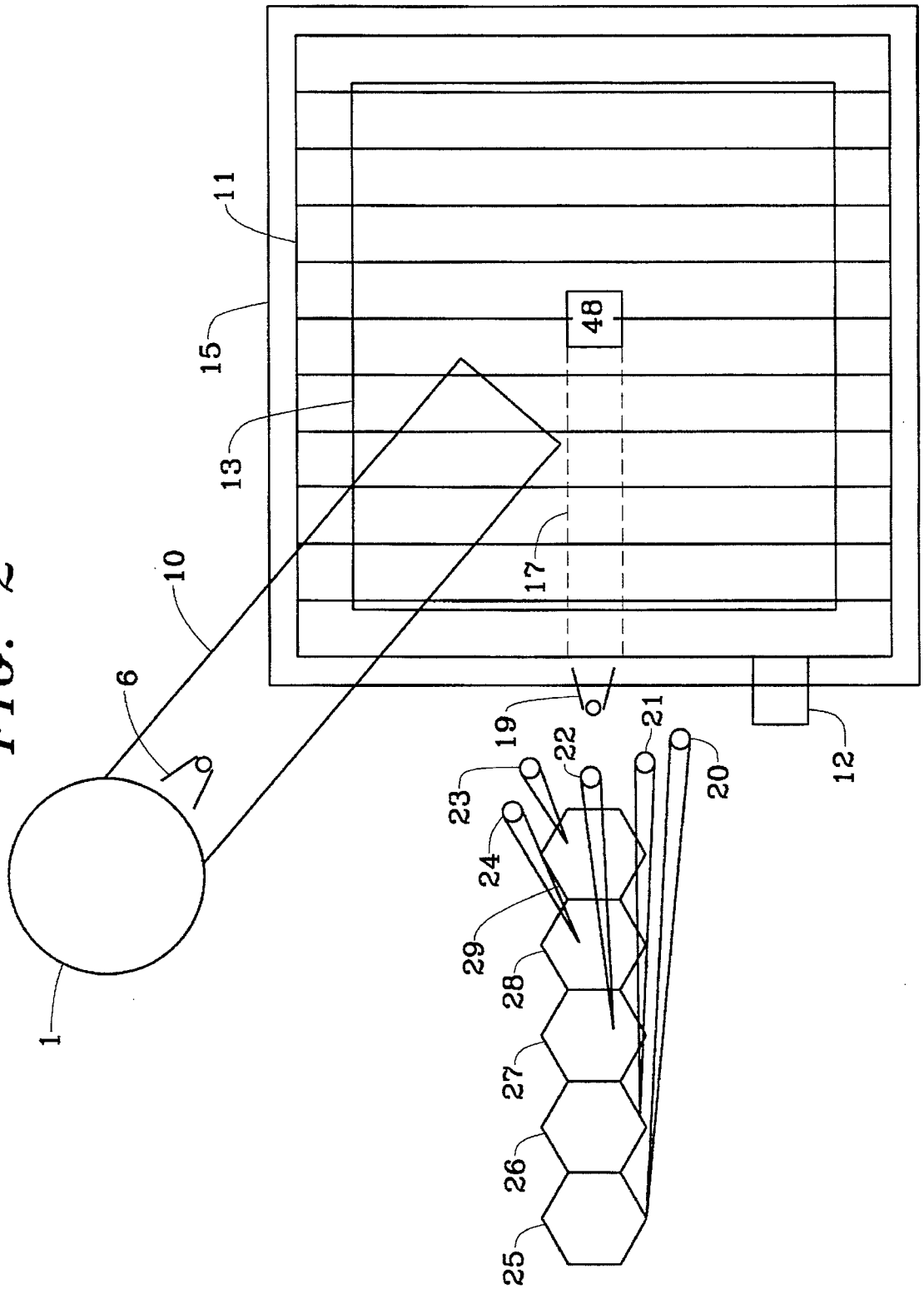
FIG. 2 top view illustrating sortation, conveyance and screening apparatus.
Figure 3:
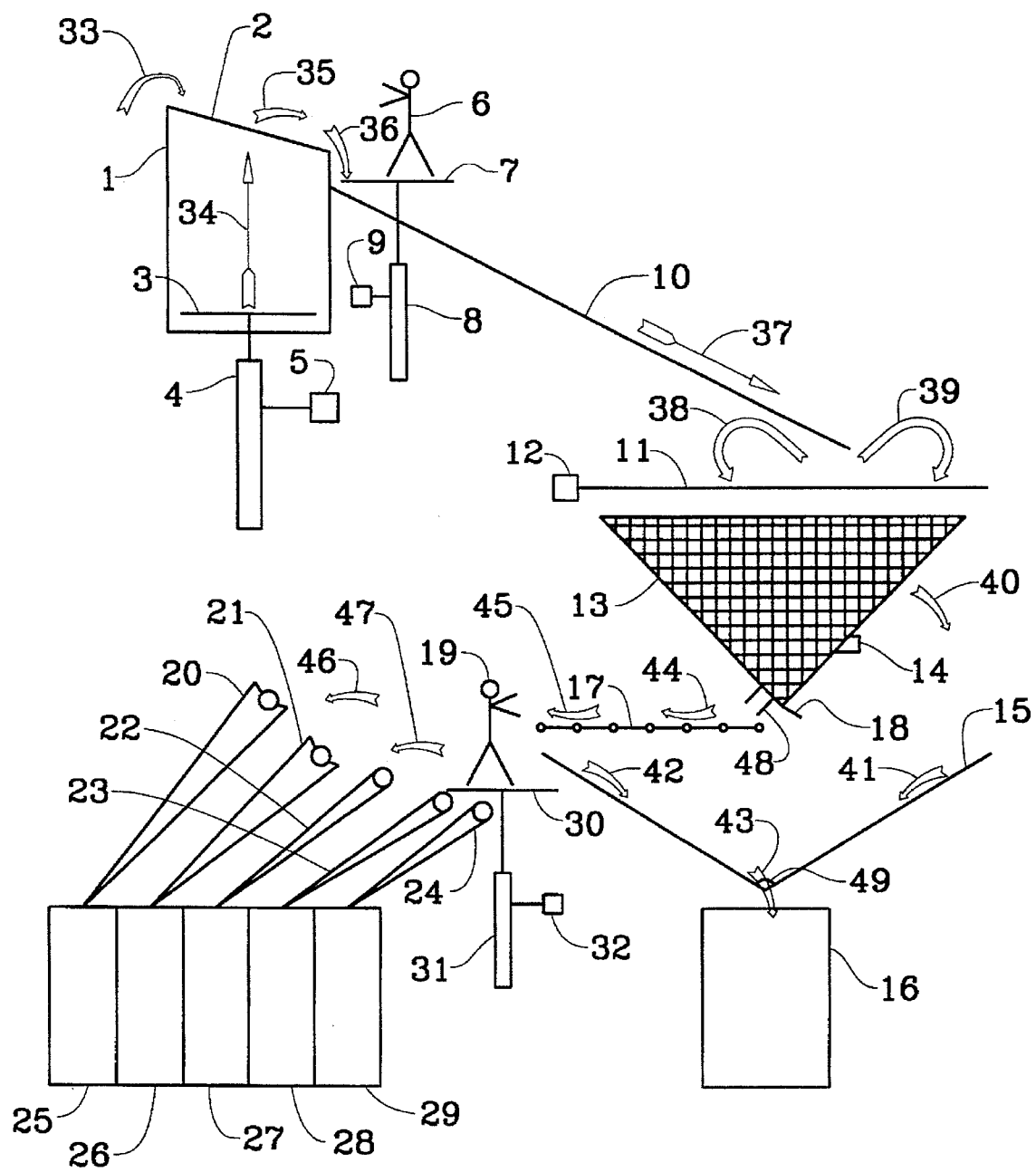
FIG. 3 side view illustrating the process of material movement through the device.

The invention consists of a tube cylinder 1 of metal or other durable material with the top end cut at an angle 2. MSW is loaded into the cylinder 1 coming to rest on an inside circular plate 3. Once full, circular plate 3 is raised by extension of hydraulic cylinder 4 powered by hydraulic pump 5. Human 6 stands upon floor platform 7 which is adjusted for maximum ergonomic benefit by hydraulic cylinder 8 and hydraulic pump 9 and associated controls. Material at the top of cylinder I spills over the cut side 2 for manual sorting at shoulder height by human 6. Non-container (e.g. paper) sorted material is placed aside for further processing. Other material is dropped or allowed to flow over cut side 2 (negative sort) onto a conveyor belt 10 for conveyance to vibrating bars 11. Vibrating sorting bars 11 consist of parallel bars spaced slightly farther apart than the smallest dimension of the largest item (container, etc.) to be sorted. Vibration is provided by electric vibrator 12. Debris not passing through vibrating sorting bars 11 is removed manually. Vibration is controlled within a range allowing most glass containers to remain whole while allowing properly sized containers to pass within a desired time period. Material passing through falls into concave vibrating screen 13. Screen 13 consists of a grid screen whose openings spaces are slightly smaller than the smallest dimension of the smallest item (e.g. glass or steel container) to be sorted. Vibration is provided by controlled electric vibrator 14. Debris (e.g. dirt, food waste) passing through these screen openings falls into hopper 15, thence to residue container 16. Items to be sorted are contained within vibrating screen 13 until sufficient time has elapsed to produce vertically sorted discrete layers of items (e.g. layers of glass bottles, layers of plastic bottles) based on differences in specific gravities of tiem materials (e.g. glass, metal, plastic) and on differences in item dimensions (e.g. bottles of 16 ounce size, cans of 12 ounce size). Materials are allowed to exit through aperture 48 onto conveyor 17 by opening sliding valve 18. Pre-sorted material is removed by human 19 and placed into the respective chutes 20,21,22,23 and 24 depending upon recyclable class (e.g. brown glass bottles) each chute for a different class of recyclable. Human 19 stands on floor platform 30 which is adjusted for maximum ergonomic benefit (i.e. materials are handled at shoulder height or above) and raised and lowered by means of controlled hydraulic cylinder 31 and hydraulic pump 32. Material not removed by human 19 is automatically negatively sorted into residue hopper 15 which passes through aperture 49 to residue storage bin 16.

Material movement through the apparatus as shown in Drawing III consists of:

Mixed waste is loaded into steel cylinder 1 in movement 33. Mixed waste is forced upward on plate 3 in movement 34. Mixed waste spills over steel cylinder lip 2 in movement 35. Mixed recyclables not selected or discarded by human 6 fall onto conveyor 10 in movement 36. Mixed recyclables travel down conveyor 10 and fall onto vibrating bars 11 in movement 37. Mixed recyclables pass through vibrating bars 11 and fall into concave vibrating screen receptacle 13 in movements 38 and 39. Residue smaller than the smallest dimension of the smallest recyclable of interest falls through openings in the concave vibrating screen receptacle 13 and into hopper 15 in movements 40 and 41. Sorted layers of recyclable containers exit concave vibrating screen receptacle 13 by aperture 48 after sliding valve 18 is placed in the open position and land on conveyor 17 in movement 44. Recyclables are conveyed to human 19 in movement 45.

Materials not removed from conveyor 17 by human 19 fall into hopper 15 in movement 42. Residue in hopper 15 falls through aperture 49 into storage bin 16 in movement 43. Recyclable containers are removed from conveyor 17 and placed in their respective chutes 20-24 by human 19 in movements 46 and 47.

Comparison with prior art

U.S. Pat. No. 3,973,735 taught pulverization of waste for processing in contrast to this apparatus which preserves container integrity as an aid to human sortation. U.S. Pat. No. 5,234,109 relayed belt sorting, magnetic removal of ferrous material and vibratory elimination of glass residue whereas this invention separates multiple classes of recyclables (e.g. glass, plastic and steel containers) vertically into layer horizons in a one step process. U.S. Pat. No. 5,249,690 presented belt sorting versus vibratory separation of containers as in the process presented herein. U.S. Pat. No. 5,250,100 instructed floor tipping versus the uplifting presentation of material to the human sorter in this invention. U.S. Pat. No. 5,314,071 explained crushing of glass as opposed to no intentional reduction in glass container size in this process. U.S. Pat. No. 5,344,025 illustrated residue removal with a vibrating screen versus the use of a concave vibrating screen for three dimensional residue removal employed in this invention.

Advantages of this apparatus and process are:

Separation of materials by specific gravity and size increases the efficiency with which MSW can be belt sorted by humans. Similar items are grouped together for simplier sorting. Fewer sorting decisions have to be made by the human sorters. As the recyclables are less of an unsegregated mixture mental and physical strain is reduced due to fewer required sorting decisions and movements. As mental strain is reduced efficiency improves as fewer sorting mistakes are made. Segregated items can be removed from the picking belt with a shovel or similar device rather than removed individually by hand. Due to these and ergonomic advantages the picking belt may be run at increased speed. Debris is removed by negative sortation throughout the process increasing quantitative efficiency. Materials are processed by humans at shoulder height reducing strain encountered bending over a picking belt. Less strain provides ergonomic benefits resulting in increased efficiency and productivity and decrease in work-related injuries (e.g. carpal tunnel syndrome).

What is claimed is:

1. Process for sorting recyclable containers and other materials from mixed waste comprising the steps of:
    placing mixed waste in an open top steel cylinder receptacle whose bottom is a steel plate, said bottom being upwardly mobile by means of a controlled hydraulic cylinder,
    controllably allowing said bottom to rise within the cylinder receptacle pushing the mixed waste upward,
    sortation of the mixed waste manually, permitting items not sorted to spill over the lower lip of the cylinder receptacle onto a moving conveyor belt,
    conveying said items to a set of controlled vibrating bars,
    dropping of properly sized mixed containers by gravity through said vibrating bars into a vibrating concave screen receptacle,
    manually removing of debris from said vibrating bars,
    sortation by vibrational and gravitational forces of mixed containers into discrete layers of containers having similar specific gravities and sizes,
    passing said layers through an opening in the bottom of the concave vibrating screen receptacle onto a controlled moving conveyor belt,
    manually removing sorted containers from the concave vibrating receptacle.

2. The process of claim 1 including removing items not of interest for discard from the steel cylinder receptacle, passing debris smaller than the smallest dimension of the smallest recyclable container of interest through openings in the sides of the concave vibrating screen receptacle in a three dimensional manner into a residue hopper, opening a sliding valve previously closing the opening in the bottom of the vibrating concave screen receptacle, discharging the sorted items through said opening of said concave vibrating screen receptacle by gravity flow onto a moving conveyor belt.

3. The process of claim 1 wherein said vibrating bars serve as a presortation system for a vertically oriented hybrid manual/mechanical mixed recyclables classification system wherein recyclables other than paper fall on vibrating sorting bars which comprise parallel bars spaced slightly farther apart than the smallest dimension of the largest item to be sorted, with vibration being provided by an electric vibrator, debris not passing through the vibrating bars being removed manually, vibration being controlled within a range so most glass containers remain whole while properly sized containers pass within a desired time period.

4. The process of claim 1 including:
    passing debris smaller than the smallest recyclable of interest through openings in the side of the concave vibrating screen receptacle in horizontal and vertical directions and falling by gravity into a residue hopper at the same time as materials contained within said concave vibrating screen receptacle are sorted according to gravity and size differences by vibrational and gravitational forces into discrete layer horizons.

5. The process of claim 1 wherein said concave vibrating screen receptacle serves as a pre-sorter and classifier of mixed recyclable containers.

6. The process of claim 1 in which material for sortation encounters operators at an ergonomically designed adjustable level of approximately shoulder height.

7. The process of claim 1 in which multiple types and sizes of recyclable containers are sorted into multiple layers of containers of different specific gravities and different sizes by gravitational and vibrational forces within said concave vibrating screen receptacle as part of the same machine process and at the same time.

8. The process of claim 1 in which the concave vibrating screen receptacle vibrates for a period of time sufficient to allow sortation of recyclable container layer horizons based on said; similar specific gravities and sizes, and empties the sorted layer horizons of recyclable containers onto a belt conveyor upon opening a sliding valve previously sealing off the opening; in the bottom of the concave vibrating screen receptacle.

9. The process of claim 1 including vertical classification of mixed recyclable containers in a vertical direction by application of vibratory movement to a mass of mixed recyclable containers.

10. The process according to claim 1 wherein classified recyclable containers are presented for manual final sortation and removal.

11. The process of claim 1 including, sensing when the steel cylinder receptacle is empty due to the advancement of the cylinder bottom upward to the cylinder lip, lowering said cylinder bottom by means of a controlled hydraulic cylinder to allow introduction of a subsequent batch of mixed waste.

12. The process of claim 1 including, sensing the concave vibrating screen receptacle is full, then discontinuing sending of material by the operator from the steel cylinder receptacle; forward until said concave vibrating screen receptacle is emptied, sensing the concave vibrating screen receptacle is full the operator opens a sliding valve closing said opening in the concave vibrating screen receptacle; to allow the contents to empty onto the conveyor belt, sensing the concave vibrating screen receptacle is empty then closing the sliding valve to allow a subsequent batch of mixed containers to accumulate.

13. The process of claim 1 in which desirable items not to be discarded or processed in the concave vibrating screen receptacle are removed by the operator of the steel cylinder receptacle and placed aside for future processing.

14. Apparatus for sorting recyclable containers and other materials from mixed waste, comprising an open steel cylinder with cutaway lip containing a detached inner steel plate capable of vertical movement by means of a controlled hydraulic cylinder, control means for controlling movement of said hydraulic cylinder, a steel floor platform positioned by movement of a second controlled hydraulic cylinder to facilitate sortation manually, a controlled conveyor conveying recyclable material to vibrating bars, a controlled concave vibrating screen receptacle beneath the vibrating bars, an aperture in the bottom of said concave vibrating screen receptacle, a sliding valve to seal off said aperture, a residue hopper beneath the concave vibrating screen receptacle chutes for reception of sorted recyclable containers, and storage bins to receive said recyclable containers.

15. Apparatus as recited in claim 14 wherein said vibrating bars are spaced one inch longer apart than the smallest dimension of the largest recyclable container of interest.

16. Apparatus as recited in claim 14 wherein openings in the concave vibrating screen receptacle are ⅛ inch smaller than the smallest dimension of the smallest recyclable container of interest.

17. Apparatus as recited in claim 14 wherein conveyor conveying sorted containers from the concave vibrating screen receptacle extends to within reach of manual; sortation but stops short of the lip of the residue hopper by approximately one foot.

18. Apparatus as recited in claim 14 wherein an operator; is positioned at an ergonomically designed level for receiving mixed recyclables rising upward in steel cylinder 1 at approximately shoulder height by means of a controlled hydraulic cylinder driven by a hydraulic pump.

19. Apparatus as recited in claim 14 in which an operator; positioned at an ergonomically designed level for receiving mixed recyclables from a belt conveyor after a concave vibrating screen receptacle at approximately shoulder height by means of a controlled hydraulic cylinder driven by a hydraulic pump.

* * * * *